Dec. 13, 1960     R. L. TUCKER ET AL     2,964,677
TEMPERATURE STABILIZATION OF ELECTRONIC TUBES
Filed July 5, 1957

INVENTOR.
Robert L. Tucker
Eric C. Hopkinson
BY

*Attorney*

United States Patent Office 2,964,677
Patented Dec. 13, 1960

2,964,677

TEMPERATURE STABILIZATION OF ELECTRONIC TUBES

Robert L. Tucker and Eric C. Hopkinson, Tulsa, Okla., assignors to Well Surveys Incorporated, a corporation of Delaware Filed July 5, 1957, Ser. No. 670,161

9 Claims. (Cl. 315—107)

This invention relates to means for stabilization of an electronic device against variations responsive to changes in the ambient temperature, and more particularly to such means adapted to be used in a subsurface instrument which may be lowered in a borehole for the purpose of well logging.

The instrumentation used in the field of well logging and intended to be lowered in a borehole normally comprises a signal source adapted to apply signals to the side walls or a part of the side wall of the borehole. Such signals may be mechanical waves, electric potentials, rays of nucleons or rays of electromagnetic waves having very short wave length, such as X-rays or γ-rays. Hence the source may be an acoustic transmitter, an electrode or a radioactive source. When a signal is emitted by such a source, there will be an interaction between some parts of the formations around the borehole and the signal applied thereto. This interaction modifies the signal in a manner which depends upon the characteristic properties of the respective formations. Variations of the formations causes a variation of said interaction and of said modification of the signal. If a detector is energized by this signal after its modification, the variations of the detected signal yield information about the formation which has modified the applied signal. Normally the detector cooperates with an electronic circuit adapted to convert the measured signals into a desired form for recording. In some instances, the signal will simply be recorded as detected. However, in other cases, the electronic circuit may comprise a discriminator adapted to separate and to pass or reject selected signals, as desired, to obtain special information regarding the sub-strata of the earth. This selection of signals normally is done to obtain the frequency spectrum, energy spectrum, or some other spectrum of the signals. Much information may be read out of these spectra.

It is very advantageous to install such a discriminator in the subsurface instrumentation because the transmission of selected signals is easier and less subject to disturbances than the transmission of the total output of the detector. It will be appreciated that the characteristics of the discriminator must not be changed during operation. However, the discriminator is subjected to extreme temperature conditions when it is lowered together with the instrumentation several miles within a borehole, where the temperature may reach 300° F.

Many electronic devices are troublesome when exposed to extreme changes in operating conditions of any kind. In particular, high temperatures change the characteristics of electronic units. It is known in the art to provide diodes in electronic trigger circuits. The conductance of these devices is changed by a change in temperature. The conductance of a diode varies inversely with the absolute temperature of the cathode of the diode.

In some low level discriminators, diodes are operated under retarding field conditions, and the circuit remains stable only if the diode conductance remains constant. But the conductance of the diode and hence the voltage across the diode will change with temperature. However, in a subsurface instrument which is lowered in a borehole, temperatures as high as 300° F. may be encountered. Thus, the characteristics of the discriminator may change considerably.

According to the present invention temperature responsive resistance means is connected to the filament circuit of an electronic tube. These resistors will be subjected to the same influence of ambient temperature as the filaments and the cathode of the diode. If the cathode temperature is changed because of heat transfer between the environment and the tube, the temperature responsive resistance means in the filament circuit will also change the voltage applied to the filaments. The energy delivered to the cathode thus is controlled by the voltage across the temperature responsive resistance means, thereby controlling temperature. With the means provided according to the present invention, electronic devices can be used in the subsurface instrumentation of a logging tool even though the tools are subjected to a considerable variation in temperature. The effective resistance of an electron tube then will not change with temperature and consequently, stable working conditions are guaranteed.

It is a primary object of the present invention to overcome difficulties arising when electronic circuits have to operate under variable temperature conditions.

It is another object of the present invention to stabilize the conductance of a diode upon changes in temperature.

It is still another object of the present invention to provide stabilizing means in electronic circuits adapted to be mounted in a well logging instrument.

It is further object of the invention to provide stabilizing means for diodes responsive to temperatures in low level discriminators.

These and other objects of the present invention will become apparent by reference to the accompanying drawings.

Figure 1:
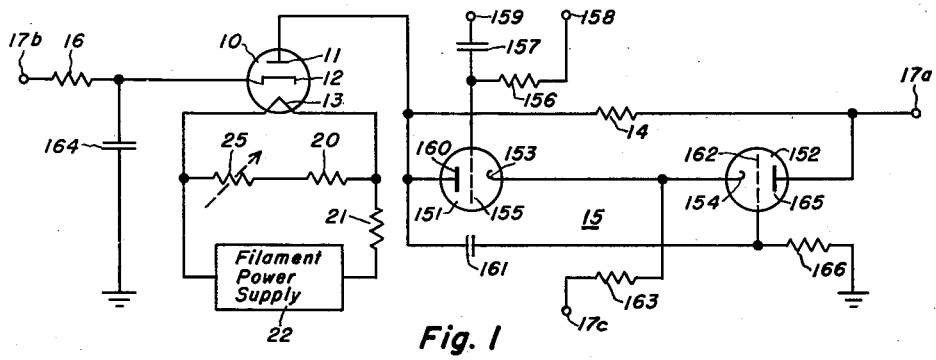
Fig. 1 shows a diagram of a discriminator circuit including a preferred embodiment of the invention, comprising a device in which the filament circuit is provided with a thermistor.

In Fig. 1 the numeral 10 indicates a diode, having an anode 11, a cathode 12 and a filament 13. This diode may be subjected to changes in temperature over a large range, but has to be made to operate independently of temperature variations. A resistor 14 is connected to the anode 11 of this diode 10. It will be understood that the diode 10 and this resistor 14 are parts of the discriminator circuit 15. The conductance of the diode 10 is important for stable operation. All elements shown in Fig. 1, for example, may be mounted in a well logging instrument having in common the task of selecting signals.

Circuit 15 comprises two grid controlled electronic tubes 151, 152 having the cathodes 153 and 154 thereof connected by a common line to a source of voltage 17c through resistor 163. The grid 155 of tube 151 is provided with grid biasing resistor 156 connected in parallel with pulse input 159 through a capacitor 157. The bias source and the pulse source are not shown, but the numerals 158 and 159 indicate the input terminals of the bias source and the pulse input respectively. The anode 160 of tube 151 is connected through a capacitor 161 to the grid 162 of tube 152. Grid 162 is grounded through resistor. The anode 165 of tube 152 is connected to the positive potential 17a of the voltage source. The cathode 12 of diode 10 is connected to ground through a capacitor 164, and to a terminal 17b of the voltage source through resistor 16. The terminal 17b has a potential the magnitude of which is between the potentials 17a and 17c. It will be appreciated that the circuit indicated by the numerals 151 through 164 may be replaced by any kind of electronic circuit i.e., the discriminator itself is not part of the invention, but any circuit having diodes, such as 10, which must operate without temperature dependence may serve for substitution.

A thermistor 20 and resistor 25 are connected in parallel with filament 13; and a resistor 21 is connected in series with both the filament 13 and the thermistor 20. The numeral 22 indicates either a D.C. or an A.C. voltage supply source connected in series with resistor 21. The three resistors 20, 25 and 21 serve as voltage divider for the filament 13. Thus, the voltage drop across the thermistor 20 and the resistor 25 is the voltage supplied to the filament and determines the heating current and the temperature of the cathode 12 responsive thereto. The resistor 25 is provided to adjust the device to provide the desired conduction of the filament and the cathode with respect to the temperature and the heat transferred between the environment and this cathode. Resistor 25 may be adjustable.

A thermistor is a device having a negative temperature coefficient of resistance or a negative temperature-resistance characteristic so that when the ambient temperature increases, the resistance of the thermistor 20 decreases causing a higher flow of current through the resistor 21. Consequently the voltage drop across resistor 21 increases and the voltage applied to filament 13 decreases because the difference between the constant voltage of the source 22 and the voltage drop across resistor 21 has been reduced. Since the cathode temperature increases with an increase in the filament voltage, it is apparent that a decreasing voltage supplied to the filament of the cathode will compensate for the increase of the temperature of the cathode which would otherwise have been caused by an increased ambient temperature.

There are many variables producing various effects upon the cathode temperature, and indeed upon other circuit components. Heating of the filament and cathode is proportional to the square of filament voltage; it is inversely related to filament resistance, which varies with temperature. Heat dissipation from the cathode is a function of the fourth power of the ambient temperature. Although it is possible to measure the exact effect from each variable and devise a circuit that will exactly compensate for the effects of temperature drift over all ranges, it has been found that, over a limited but sufficient range, a single ordinary thermistor used in the manner shown in Fig. 1 is satisfactory. The temperature compensation circuit of Fig. 1 is particularly suited for radioactivity well logging. The low level discriminator of Fig. 1 has been tested in a radiation detection system without the compensating thermistor 20. Over a range of 70 to 300° F. there was more than a 6% change in counting rate. To be suitable for radio-activity well logging, 1% is considered barely tolerable and ½% is desirable. The inclusion of an ordinary thermistor, a Bendix-Frieze thermistor No. 923339-2 in the manner shown in Fig. 1, reduced the temperature drift to ½%. A complex compensation network was found unnecessary for a practical compensation, although it is within the scope of this invention to compensate with a network which will more exactly match the normal temperature drift.

The resistance of the thermistor 923339-2 was approximately equal to the filament resistance at 300° F. and ten times as great at 70° F. The resistance in parallel with the filament should, at room temperature, be at least ten times the filament resistance or the filament power supply is unnecessarily loaded under ordinary operating conditions. On the other hand, the parallel resistance when hot is preferably of the order of the filament resistance. If greater, the compensation range is more limited and if less the net resistance in the parallel branch is so reduced as to materially change the impedance in the filament voltage circuit.

Many common diodes are rated at 150 ma. current and have 40 ohms resistance for operation with a 6.3 volt filament transformer. For such tubes, resistor 21 may be 4 ohms for satisfactory compensation over the range 70°–300° F. with the 923339-2 thermistor.

Figure 2:
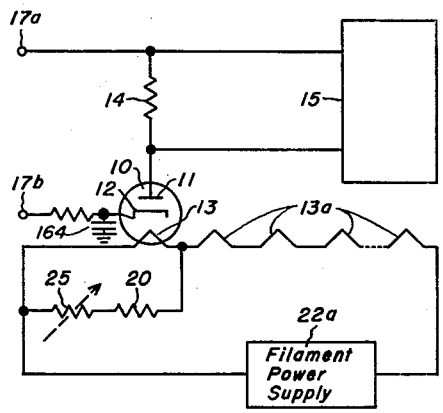
Fig. 2 shows a modification of the device shown in Fig. 1 in which the filament circuit operates from a current regulated power supply.

In well logging it is often more convenient to use a current regulated power supply for a string of filaments in series, usually 150 ma. Fig. 2 illustrates the invention as modified for such operation. Other filaments 13a are the filament string in series with the parallel arrangement of filament 13 and compensating thermistor 20. Filament current supply 22a is current regulated. Dropping resistor 21 is not necessary as current through filament 13 is not changed by dropping the voltage from a voltage regulated power supply but rather by diverting current from a current regulated power supply. Otherwise the circuit is similar to that of Fig. 1.

Figure 3:
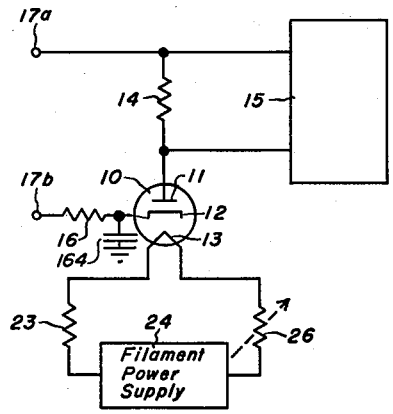
Fig. 3 shows in another diagram of an electrical device still within the scope of the invention. This device comprises a resistor the resistance of which increases with the temperature.

Turning now to Fig. 3 the numerals 10 through 17 correspond to the elements indicated by the numerals 10 through 17 in Fig. 1, and 15 may be a circuit such as 15 in Fig. 1 or a different one. The resistor 23 has a resistance which increases with respect to temperature increase. It may be a chromium-nickel-resistor having approximately a relationship of 1:3 through 1:5 of chromium-nickel respectively. The resistor 23 is connected in series with filament 13 and either a D.C. or an A.C. voltage source 24. A series resistor 26 is provided for adjustment. If the ambient temperature increases both the resistance of the resistor 23 and the temperature of the cathode 12 increases. The increasing resistance of resistor 23 reduces the voltage delivered to the filament 13 because this voltage is the difference between the constant voltage of source 24 and the increased voltage drop across resistor 23. A reduction of the filament voltage and of the current heating the cathode responsive thereto compensate for the increased temperature of the cathode otherwise caused by the higher ambient temperature.

Figure 4:
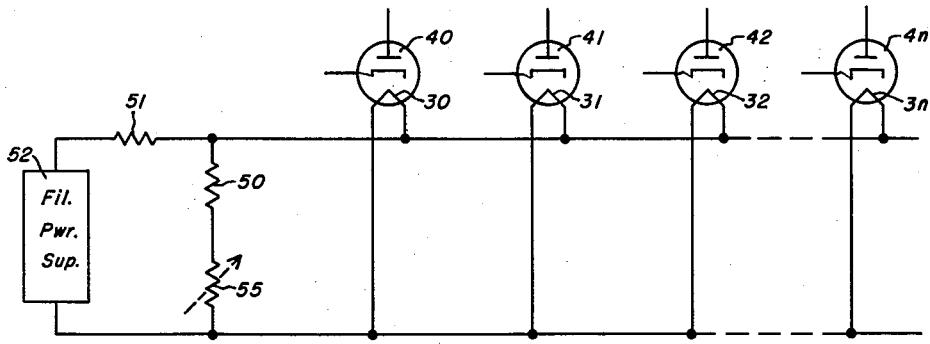
Fig. 4 shows diagrammatically the application of the invention for the temperature compensation of more than one diode.

In Fig. 4 is shown a plurality of diodes which may be elements of a circuit of any type. From this circuit it is apparent that the invention is not restricted to devices with only one diode. A circuit composed according to the present invention may be used for temperature compensation of a larger number of diodes. The filaments 30, 31, 32 . . . 3n are parts of the diodes 40, 41, 42 . . . 4n respectively. All these filaments are connected in parallel. It is not necessary that the respective electrodes of the diodes have common potentials. The thermistor 50, an adjustable resistor 55, a common resistor 51, and a voltage source 52 are cooperating substantially as described with reference to Fig. 1. Of course, the use of a common temperature compensation of all the diodes 40, 41, 42 . . . 4n requires that they all are subjected to equal ambient temperature conditions.

Although this invention has been described for use with diodes having indirectly heated cathodes, it is also useful in stabilizing the temperature of directly heated cathodes and for grid controlled tubes.

It is to be understood that this invention is not to be limited to the specific modifications described, but is to be limited only by the scope of the following claims, in which:

We claim:
1. A temperature stabilized device comprising an ele- tron tube having a heater filament, a filament power supply connected to supply power to heat said filament, and temperature responsive resistance means connected to said filament power supply, said resistance means being exposed to the same temperature environment as said tube and having a temperature-resistance characteristic such that plate current in the tube remains substantially constant when the tube temperature environment changes substantially from normal temperature.

2. A temperature stabilized device comprising a vacuum tube having an anode, an indirectly heated cathode, and a heater filament operatively arranged to heat said cathode, a filament power supply connected to supply power to heat said filament, temperature responsive resistance means connected to said filament power supply and said heater filament, said resistance means being exposed to the same temperature environment as said tube and having a temperature-resistance characteristic such that power to said filament varies with ambient temperature to heat said cathode to such temperature that electron emission therefrom remains substantially constant when the tube temperature environment changes substantially from normal temperature.

3. A temperature stabilized device comprising a vacuum tube having an anode, an indirectly heated cathode, and a heater filament operatively arranged to heat said cathode, a filament power supply connected to supply power to heat said filament, temperature responsive resistance means connected in series with said heater filament, said resistance means being exposed to the same temperature environment as said tube and having a positive temperature-resistance characteristic such that power to said filament varies with ambient temperature to heat said cathode to such temperature that electron emission therefrom remains substantially constant when the tube temperature environment changes substantially from normal temperature.

4. A temperature stabilized device comprising a vacuum tube having an anode, an indirectly heated cathode, and a heater filament operatively arranged to heat said cathode, a filament power supply connected to supply power to heat said filament, resistance means connected in series with said filament power supply, a thermistor connected in parallel with said heater, said thermistor being exposed to the same temperature environment as said tube and having a negative temperature-resistance characteristic such that power to said filament varies with ambient temperature to heat said cathode to such temperature that electron emission therefrom remains substantially constant when the tube temperature environment changes substantially from normal temperature.

5. A temperature stabilized device comprising a diode operating under retarding field conditions and having a heated cathode, a heater power supply connected to supply power to heat said cathode, temperature responsive resistance means connected to said power supply, said resistance means being exposed to the same temperature environment as said tube and having a temperature-resistance characteristic such that net power supplied to heat said cathode maintains electron emission therefrom substantially constant when the tube temperature environment changes substantially from normal temperature.

6. A temperature stabilized device comprising a diode operating under retarding field conditions and having a heated cathode, a heater power supply connected to supply power to heat said cathode, temperature responsive resistance means connected in series with said power supply, said resistance means being exposed to the same temperature environment as said tube and having a positive temperature-resistance characteristic such that current from said power supply to heat said cathode varies with ambient temperature to maintain electron emission therefrom substantially constant when the tube temperature environment changes substantially from normal temperature.

7. A temperature stabilized device for well logging at temperatures up to 300° F. comprising a diode operating under retarding field conditions and having a heated cathode, a heater power supply connected to supply power to heat said cathode, resistance means connected in series with said power supply, a thermistor connected in parallel with said series connected resistance means and power supply, said thermistor being exposed to the same temperature environment as said tube and having a negative temperature-resistance characteristic such that current from said power supply to heat said cathode varies with ambient temperature to maintain electron emission therefrom substantially constant when the tube temperature environment changes substantially from normal temperature, said thermistor having a resistance of the order of the cathode heater at 300° F. and at least 10 times this resistance at room temperature.

8. A temperature stabilized device for well logging at temperatures up to 300° F. comprising a diode operating under retarding field conditions and having a heated cathode, a heater power supply of approximately 6.3 volts with negligible internal resistance connected to supply power to heat said cathode, resistance means of approximately 4 ohms connected in series with said power supply, a thermistor connected in parallel with said series connected resistance means and power supply, said thermistor being exposed to the same temperature environment as said tube and having a negative temperature-resistance characteristic such that current from said power supply to heat said cathode varies with ambient temperature to maintain electron emission therefrom substantially constant when the tube temperature environment changes substantially from normal temperature, said thermistor having a resistance of the order of the cathode heater at 300° F. and at least 10 times this resistance at room temperature.

9. A temperature stabilized device for well logging at temperatures up to 300° F. comprising a diode operating under retarding field conditions and having an anode, an indirectly heated cathode, and a heater filament operatively arranged to heat said cathode, the resistance of said filament being approximately 40 ohms, a heater power supply of approximately 6.3 volts with negligible internal resistance connected to supply power to heat said filament, resistance means of approximately 4 ohms connected in series with said power supply, a thermistor connected in parallel with said series connected resistance means and power supply, said thermistor being exposed to the same temperature environment as said tube and having a negative temperature-resistance characteristic such that current from said power supply to heat said cathode varies with ambient temperature to maintain electron emission therefrom substantially constant when the tube temperature environment changes substantially from normal temperature, said thermistor having a resistance of the order of said heater filament at 300° F. and at least 10 times the resistance of said heater filament at room temperature.

References Cited in the file of this patent

UNITED STATES PATENTS 2,466,250  Marshall _____ Apr. 5, 1949

OTHER REFERENCES

Bell System Technical Journal, pages 170 to 212, vol. 26, 1947.